(12) United States Patent
Amtmann et al.

(10) Patent No.: US 8,441,340 B2
(45) Date of Patent: May 14, 2013

(54) TAG COMMUNICATION DEVICES

(75) Inventors: Franz Amtmann, Graz (AT); Thomas Wille, Hamburg (DE); Hauke Meyn, Krempermoor (DE); Mathias Wagner, Alvensen-Rosengarten (DE)

(73) Assignee: NXP B.V., Eindhoven (NL)

( * ) Notice: Subject to any disclaimer, the term of this patent is extended or adjusted under 35 U.S.C. 154(b) by 249 days.

(21) Appl. No.: 13/047,400

(22) Filed: Mar. 14, 2011

(65) Prior Publication Data

US 2011/0241835 A1 Oct. 6, 2011

(30) Foreign Application Priority Data

Mar. 15, 2010 (EP) .................................. 10156541

(51) Int. Cl.
*H04Q 5/22* (2006.01)
(52) U.S. Cl.
USPC .... 340/10.1; 340/572.7; 340/5.92; 343/700 R
(58) Field of Classification Search ................ 340/10.1, 340/572.1, 572.7, 5.92; 235/492; 375–385; 343/700 R
See application file for complete search history.

(56) References Cited

U.S. PATENT DOCUMENTS

| 6,825,754 | B1 | 11/2004 | Rolin | |
|---|---|---|---|---|
| 8,068,031 | B2 * | 11/2011 | Forster | 340/572.7 |
| 2003/0171984 | A1 * | 9/2003 | Wodka et al. | 705/14 |
| 2006/0000907 | A1 | 1/2006 | Forster | |
| 2006/0238344 | A1 * | 10/2006 | Kubby | 340/572.1 |
| 2008/0117048 | A1 * | 5/2008 | Rachwalski et al. | 340/572.1 |

OTHER PUBLICATIONS

Extended European Search Report for European Patent Application No. 10156541.4 (Aug. 11, 2010).

* cited by examiner

*Primary Examiner* — Benjamin C Lee
*Assistant Examiner* — Jessica J du Maine

(57) ABSTRACT

A contactless tag reader device comprises upper and lower electrodes which together define a tag location zone between them in which multiple tags can be placed. The lower electrode and the upper electrode are offset from each other such that they substantially do not overlap. This structure is used to sandwich tags vertically between two horizontally (laterally) offset reader electrodes. This enables power coupling and data transfer using capacitive coupling.

11 Claims, 3 Drawing Sheets

TAG COMMUNICATION DEVICES

CROSS-REFERENCE TO RELATED APPLICATIONS

This application claims the priority under 35 U.S.C. §119 of European patent application no. 10156541.4, filed on Mar. 15, 2010, the contents of which are incorporated by reference herein.

This invention relates to tag communication devices, including RFID systems, and relates in particular to the reading of multiple tags simultaneously.

The use of tags to identify objects is becoming increasingly common, with a tag reader device used to find and communicate with a tag. The tag can for example comprise a contactless smart card, contactless RFID tag, or contactless electronic badge.

This invention relates in particular to systems in which a stack of tags is to be interrogated. A known example is the use of tags in the form of electronic labels in libraries for identifying books or CDs, which can be stacked typically in piles of 5 to 10. Another known example is casino chips.

In typical arrangements, the reader device in such arrangements has an antenna coil for emitting an oscillating magnetic field, and is arranged to detect the presence of a tag within a communication perimeter of the reader.

For a passive tag, the required energy transfer from the reading device to the tag is typically accomplished by inductive coupling (LF and HF) or by electromagnetic radiation (UHF). The tag antennas are predominantly tuned to resonance, by means of an LC resonance circuit (LF, HF) or by mechanical properties (e.g. length at UHF frequencies).

The detection of a tag typically involves an identification request that must be repeatedly sent out by the reader. Upon receiving such a request, the tag present in the interrogation field of the reader sends back an identification message. The identification message can be personalised and comprise an identification number of the tag, such as its serial number or any other identifier. The identification message can also be a simple anonymous identification signal, such as a period of modulation of the amplitude of the magnetic field performed by load modulation. It is also possible for tags to send their response in randomly chosen slots.

This invention relates specifically to applications in which several tags are within the communication perimeter of a reader simultaneously. Existing communications protocols enable this scenario—for example the identification request can be coupled with an anti-collision protocol whereby one and only one integrated circuit can be selected.

There is however a problem that the tuning of the tag and reader circuit to resonance maximizes the performance of a single tag but results in a performance reduction if tags are stacked or in close proximity. In this case, the tags are detuned and the distance over which a tag can be remotely powered drops dramatically. If a certain number of stacked tags is exceeded, powering the tags is no longer possible.

Technology advances are enabling the possible size of the tags to be reduced, and the range of possible applications is growing. For example, the ability to form extremely thin tags enables them to be provided on paper (or other thin) documents such as banknotes, legal documents or other pages. There may then be stacks of tens or hundreds of tags to be read simultaneously, to find a desired document within a stack.

There is therefore a need for an arrangement which enables large numbers of stacked tags to be read.

According to the invention, there is provided a contactless reader device for detecting the presence of a tag within a stack of tags, comprising:

a lower electrode structure having a lower electrode;

an upper electrode structure having an upper electrode, wherein the lower and upper electrode structures together define a tag location zone between them in which multiple tags can be placed, wherein the lower electrode and the upper electrode are offset from each other such that they do not overlap or any overlap is less than 10% of the area of the upper or lower electrode.

This structure sandwiches tags vertically between two horizontally (laterally) offset reader electrodes. This enables power coupling and data transfer using capacitive coupling.

The invention also provides a tag communications system, comprising:

a reader device of the invention; and a plurality of tags, wherein each tag comprises a first and second tag electrode lying in a common plane and spaced such that, with the tag located in the tag location zone, the first tag electrode overlaps with the lower electrode and the second tag electrode overlaps with the upper electrode. Preferably, the first tag electrode overlaps only with the lower electrode and the second tag electrode overlaps only with the upper electrode, although due to misalignment there can be some tag electrode overlap with both electrodes, but predominantly with one.

This arrangement provides one stack of tag electrodes which are capacitively coupled to one reader electrode, and another stack of tag electrodes which are capacitively coupled to the other reader electrode. The tags will be more strongly coupled to one reader electrode and less strongly coupled to the other, but overall, all tags can be powered by and interrogated by the reader through capacitive coupling.

By "overlap" is meant that when viewed from above the stack, the position of the reader electrode and the tag electrode overlap either partially or fully.

The upper electrode, lower electrode and first and second tag electrodes can have the same area, size and shape. For each corresponding pair of reader and tag electrodes, the electrodes preferably have the same size and shape.

The tags have to be correctly aligned with respect to the reader to provide alignment of a stack of tag electrodes and respective reader electrode.

The first and second tag electrodes can have high impedance connection to the tag IC, for example more than 1 KΩ (compared to the conventional approach of low resistance connections of a few Ohms). This avoids the need for large driving voltages. A high impedance can also be achieved with a small capacitor so that the pads of the IC are not in direct galvanic contact with the antenna plates.

The tags are preferably passive tags, and power is provided to the tags by capacitive coupling between the upper and lower electrodes and the tag electrodes. Data communication between the reader and the tags is also by capacitive coupling of a modulated signal.

The upper and lower electrodes are preferably provided with an alternating drive signal of less than 135 kHz. This low frequency is desirable as a result of the high tag impedance.

Each tag can comprise a tag IC positioned between the first and second tag electrodes and in the same plane.

The invention also provides a method of interrogating a stack of tags using a tag reader device, comprising:

providing a drive signal to a lower electrode and an upper electrode of a tag reader, with a plurality of tags between them and with the lower electrode and the upper electrode offset from each other such that they do not overlap; and wherein each tag comprises a first and second tag electrode lying in a common plane and spaced such that the first tag electrode overlaps with the lower electrode and the second tag electrode overlaps with the upper electrode; and using the drive signal to provide power to the tags and to provide an interrogation signal to the tags.

An example of the invention will now be described with reference to the accompanying drawings, in which.

The invention provides a tag reader device for detecting the presence of a tag within a stack of tags. The reader has upper and lower electrodes between which multiple tags are placed. The reader electrodes are laterally offset from each other. Power coupling and data transfer to the tags uses capacitive coupling to the tags, and the tags have first and second tag electrodes lying in a common plane and spaced apart.

Figure 1:
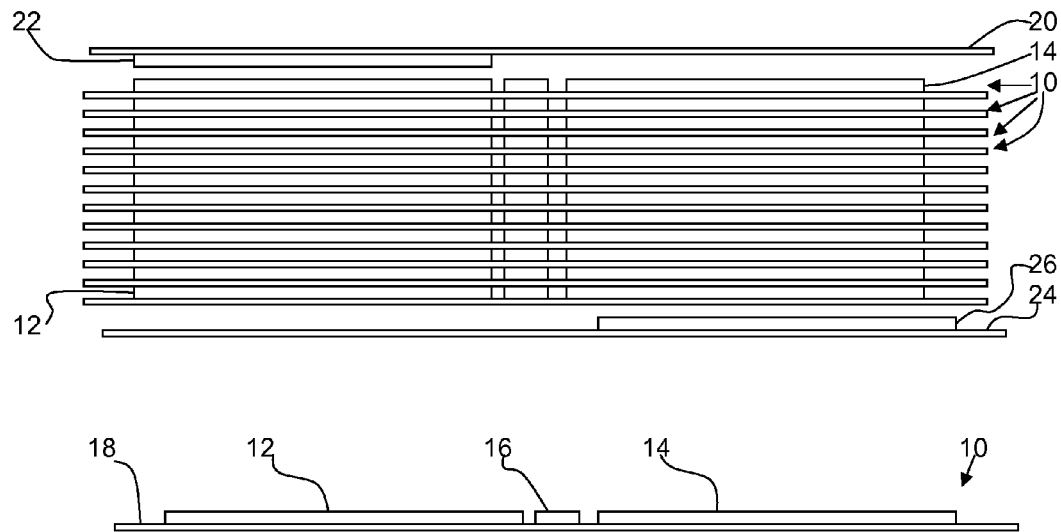
FIG. 1 shows schematically the tag and reader arrangement of the invention and also shows a single tag for clarity.

FIG. 1 shows schematically the tag and reader arrangement of the invention and also shows a single tag for clarity.

Each tag 10 comprises a first tag electrode 12, a second tag electrode 14 and a tag IC 16. These are all in a common plane on a support 18.

The reader has an upper electrode structure 20 with an upper electrode 22 and a lower electrode structure 24 with a lower electrode 26.

The tags are positioned so that the upper reader electrode 22 is aligned (as viewed from above) with the electrodes 12, and the lower reader electrode 26 is aligned (as viewed from above) with the electrodes 14.

The tag electrodes 12 are capacitively coupled to the upper reader electrode 22, and tag electrodes 14 are capacitively coupled to the lower reader electrode 26. The tags 10 can be powered by and interrogated by the reader through capacitive coupling.

All electrodes can have the same size and shape in this example, but the reader electrodes could be larger so that some misalignment of the tags can be tolerated. It is also not necessary that both reader electrodes have the same shape, although in a preferred implementation, they have the same area. For example, the tag electrode shape may be within the reader electrode shape when viewed from above.

The tag and reader electrodes can be elongate, for example 5 to 50 mm long and 0.5 to 5 mm wide. For example the electrodes may be 20 mm by 2 mm.

The thickness of the tags may be in the range 50 to 500 μm, for example 100 μm. This means a large number of tags can be stacked between the reader electrodes, for example in the range 50 to 1000. 100 tags with spacing 100 μm will require a 1 cm spacing between reader electrodes.

The first and second tag electrodes can have high impedance. This avoids the need for large driving currents (and indirectly also voltages).

The tags are passive tags, and power is provided to the tags by capacitive coupling between the upper and lower electrodes and the tag electrodes. Data communication between the reader and the tags is also by capacitive coupling of a modulated signal.

In the example of FIG. 1, the support 18 defines the article having the tag.

Figure 2:
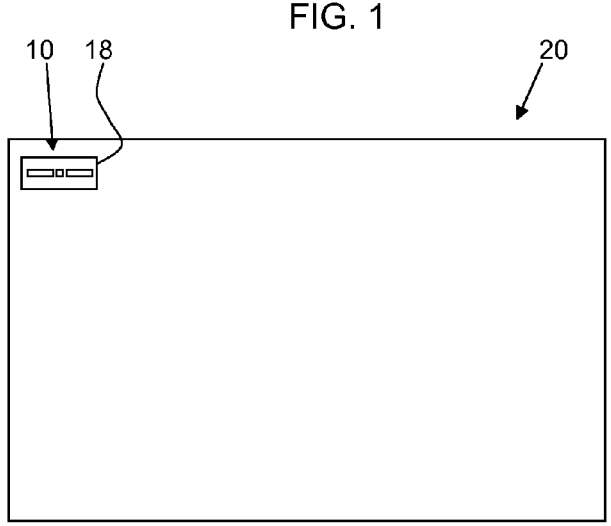
FIG. 2 shows a document having a tag of the system of the invention.

FIG. 2 shows the tag 10 attached to a document 20 (i.e. a piece of paper). In FIG. 2, the support 18 is provided over the paper of the document, but again the document itself could define the supporting surface 18 as in the example of FIG. 1.

Different waveforms can be applied to the electrodes of the reader. In particular, the waveform will be selected so that a standardised RFID communication protocol can be used.

For example, the below 135 kHz communication protocol 18000-2 can be used, for example with a frequency of 125 kHz. Alternatively, the 13.56 MHz 18000-3 protocol can be used or the UHF (860 MHz-960 MHz) 18000-6 protocol. Thus, in general, the 18000-x protocols can be used.

The lower frequency protocol is preferred as a result of the high tag impedance.

The drive signal is applied to the reader electrodes to provide power to the tags and to provide an interrogation signal to the tags.

The details of the communications protocol used to communicate with the tag do not form part of this invention and will not be discussed in detail. These aspects will be well known to those skilled in the art. For example, the 18000-2 protocol defines the forward and return link parameters for technical attributes including, but not limited to, operating frequency, operating channel accuracy, occupied channel bandwidth, spurious emissions, modulation, duty cycle, data coding, bit rate, bit rate accuracy, bit transmission order. It further defines the communications protocol used in the air interface.

The data transmission from the reader to the tag can use amplitude shift key (ASK) modulation, in which a lower frequency amplitude modulation signal is superposed over the higher frequency carrier signal. The tag to reader communication uses load modulation by altering the load of the tag circuit in a way that modulates data to be transmitted to the reader. The load modulation will be implemented by a resistor or transistor which is switched according to the information.

The use of capacitive coupling means that low distances are desired and relatively high voltages on the driving signals are needed.

Figure 3:
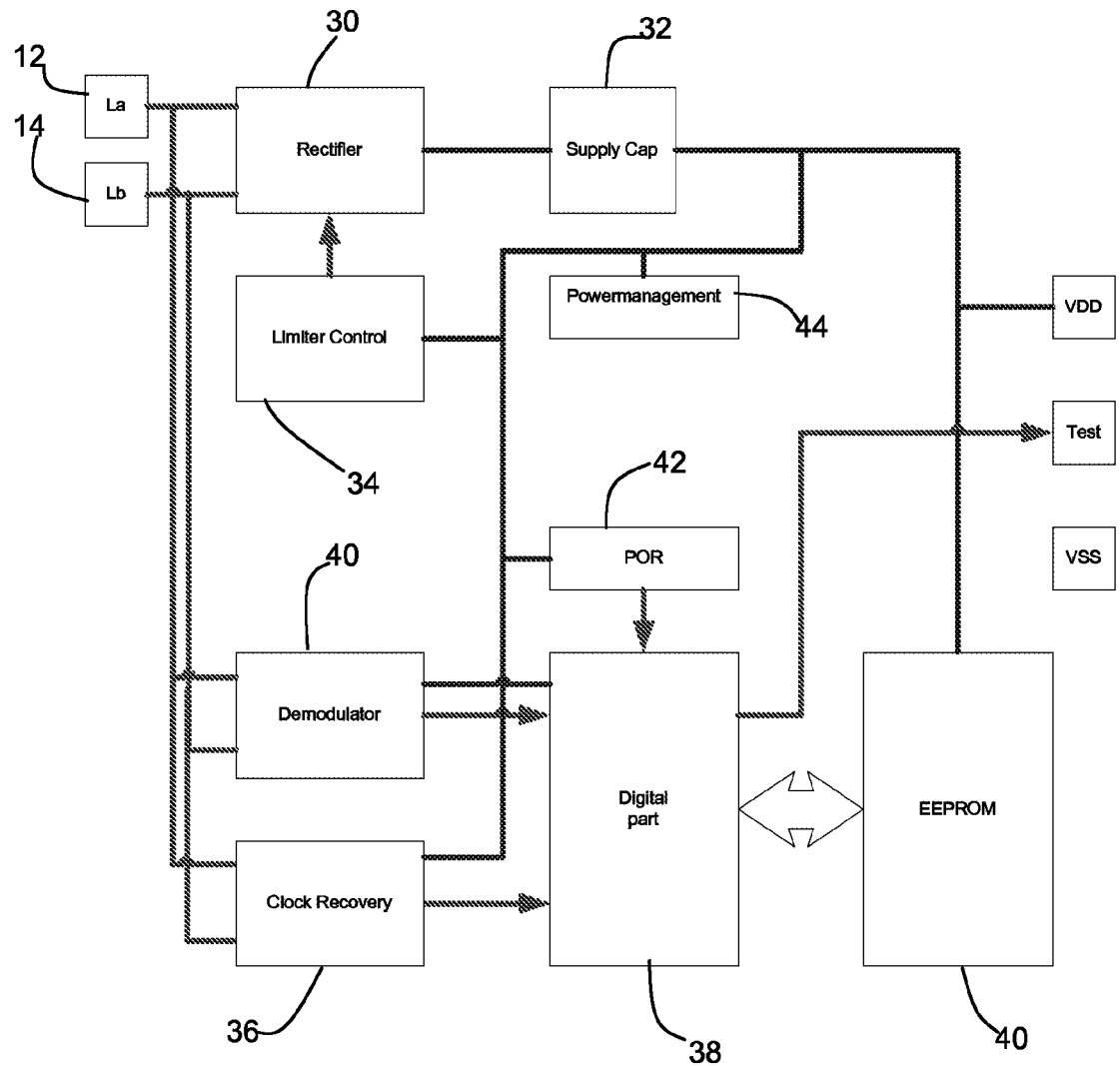
FIG. 3 shows a circuit diagram of the tag.

FIG. 3 shows a circuit diagram of the tag in the form of a passive tag powered by capacitor plates.

The tag comprises the electrodes 12,14 which receive the ac capacitively coupled signal (although galvanic contact could instead be made to the electrodes 12,14).

In order to generate the power source for the tag, the received signal is rectified by rectifier and passed through a smoothing capacitor 32 in order to generate the power level VDD. The rectifier is controlled by a limiter control unit 34 to provide feedback control of the rectifier.

The ac signal is also provided to a clock recovery circuit 36 which provides the recovered clock to the digital signal processor 38. The ac signal is also provided to a demodulator 40 for extracting the encoded data. The data is also provided to the processor 38, which controls the access to a memory 40.

The circuit includes a power-on reset part 42 and a power management unit 44 which controls the limiter control circuit 34.

The high impedance connection can be a capacitive coupling between the antenna pads and the tag capacitor plates. Due to the small area of a pad (less than 100 μm×100 μm) the achievable coupling capacitance is very low and therefore the impedance is high.

Figure 4:
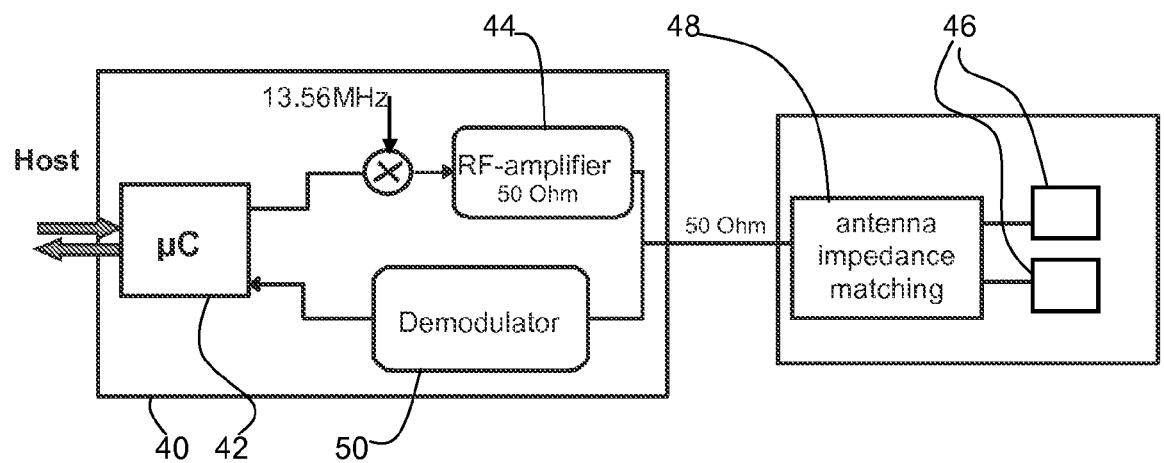
FIG. 4 shows a circuit diagram of the reader.

FIG. 4 shows the main components of the reader 40. For signal transmission, the data signal generated by a microprocessor 42 is mixed with a 13.56 MHz carrier, and this mixing implements amplitude modulation. The signal is amplified by rf amplifier 44 before being fed to the capacitor plates 46 of the reader. An impedance matching circuit 48 is also shown.

For signal reception, a demodulator 50 implements amplitude detection and provides the detected signal to the microprocessor 42.

Various modifications will be apparent to those skilled in the art.

The invention claimed is:

1. A contactless tag reader device for detecting the presence of a tag within a stack of tags, comprising:
   a lower electrode structure having a lower electrode;
   an upper electrode structure having an upper electrode, wherein the lower and upper electrode structures together define a tag location zone between them in which multiple tags can be placed in a stack, wherein the upper and lower electrodes are for power coupling and data transfer to the tags in the tag location zone by capacitive coupling; and
   wherein the lower electrode and the upper electrode are substantially parallel and laterally offset from each other such that they do not overlap when viewed from above or any overlap is less than 10% of the area of the upper or lower electrode.

2. A tag communications system, comprising:
   a reader device as claimed in claim 1; and
   a plurality of tags, wherein each tag comprises a first and second tag electrode lying in a common plane and spaced such that, with the tag located in the tag location zone, the first tag electrode overlaps with the lower electrode and the second tag electrode overlaps with the upper electrode.

3. A system as claimed in claim 2, wherein with the tag located in the tag location zone, the first tag electrode overlaps with the lower electrode only and the second tag electrode overlaps with the upper electrode only.

4. A system as claimed in claim 2, wherein upper electrode, lower electrode and first and second tag electrodes have the same area.

5. A system as claimed in claim 2, wherein each tag further comprises a tag IC and the impedance of the connection between each tag electrode and the tag IC is more than 1 KΩ.

6. A system as claimed in claim 2, wherein the tags are passive tags, and power is provided to the tags by capacitive coupling between the upper and lower electrodes and the tag electrodes.

7. A system as claimed in claim 6, wherein data communication between the reader and the tags is by capacitive coupling of a modulated signal.

8. A system as claimed in claim 6, wherein the upper and lower electrodes are provided with an alternating drive signal of less than 135 kHz.

9. A system as claimed in claim 6, wherein each tag comprises a tag IC positioned between the first and second tag electrodes and in the same plane.

10. A method of interrogating a stack of tags using a tag reader device, comprising:
    providing a drive signal to a lower electrode and an upper electrode of a tag reader, with a plurality of tags between them in a stack and with the lower electrode and a substantially parallel upper electrode laterally offset from each other such that they do not overlap when viewed from above; and wherein each tag comprises a first and second tag electrode lying in a common plane and spaced such that the first tag electrode overlaps with the lower electrode and the second tag electrode overlaps with the upper electrode; and
    using the drive signal to provide power to the tags and to provide an interrogation signal to the tags by capacitive coupling.

11. A method as claimed in claim 10, wherein the drive signal comprises an alternating drive signal of less than 135 kHz.

\* \* \* \* \*